United States Patent
Kyllonen

(10) Patent No.: US 10,542,431 B2
(45) Date of Patent: Jan. 21, 2020

(54) SYSTEM AND METHOD FOR NETWORK NODE AUTHENTICATION

(71) Applicant: Carrier Corporation, Farmington, CT (US)

(72) Inventor: Kimmo Kyllonen, Shakopee, MN (US)

(73) Assignee: Carrier Corporation, Palm Beach Gardens, FL (US)

( * ) Notice: Subject to any disclaimer, the term of this patent is extended or adjusted under 35 U.S.C. 154(b) by 98 days.

(21) Appl. No.: 15/527,268

(22) PCT Filed: Nov. 19, 2015

(86) PCT No.: PCT/US2015/061474
§ 371 (c)(1),
(2) Date: May 16, 2017

(87) PCT Pub. No.: WO2016/081684
PCT Pub. Date: May 26, 2016

(65) Prior Publication Data
US 2018/0295508 A1   Oct. 11, 2018

Related U.S. Application Data

(60) Provisional application No. 62/082,794, filed on Nov. 21, 2014.

(51) Int. Cl.
*H04W 12/06* (2009.01)
*H04W 76/14* (2018.01)
(Continued)

(52) U.S. Cl.
CPC ......... *H04W 12/06* (2013.01); *H04B 5/0056* (2013.01); *H04L 63/0876* (2013.01);
(Continued)

(58) Field of Classification Search
CPC ....... H04W 12/06; H04W 76/14; H04W 4/80; H04W 4/60; H04W 4/38; H04W 12/08;
(Continued)

(56) References Cited

U.S. PATENT DOCUMENTS 8,611,517 B2   12/2013   Bookstaff
9,237,465 B1*   1/2016   Tanner ................. H04B 5/0031
(Continued)

FOREIGN PATENT DOCUMENTS

CN   102316452   1/2012
CN   202870900   4/2013
(Continued)

OTHER PUBLICATIONS

International Search Report for International Application No. PCT/US2015/061474, dated Feb. 25, 2016.

*Primary Examiner* — Huan V Doan
(74) *Attorney, Agent, or Firm* — Locke Lord LLP; Scott D. Wofsy; Judy R. Naamat

(57) ABSTRACT

A method of commissioning a sensor includes using a system having a central control panel, a plurality of sensors, and a cloud server. A first identification code from a first near frequency communication (NFC) tag that identifies the control panel and a second identification code from a second NFC tag that identifies a sensor of the plurality of sensor are read and transmitted to the cloud server. A learn-in code is received from the cloud server and displayed to a user. The user is prompted to activate a learn-in process by entering the displayed learn-in code into the control panel for activating a learn-in mode at the control panel. The sensor is only enabled to communicate with the control panel if the control panel determines that the entered learn-in code matches a stored learn-in code.

10 Claims, 4 Drawing Sheets

(51) Int. Cl.
   *H04W 4/38* (2018.01)
   *H04W 4/60* (2018.01)
   *H04W 4/80* (2018.01)
   *H04W 12/08* (2009.01)
   *H04B 5/00* (2006.01)
   *H04L 29/06* (2006.01)
   *H04L 29/08* (2006.01)

(52) U.S. Cl.
   CPC ............... *H04W 4/38* (2018.02); *H04W 4/60* (2018.02); *H04W 4/80* (2018.02); *H04W 12/08* (2013.01); *H04W 76/14* (2018.02); *H04L 67/10* (2013.01)

(58) Field of Classification Search
   CPC ............ H04W 84/18; H04W 12/00512; H04B 5/0056; H04L 63/0876; H04L 67/10
   See application file for complete search history.

(56) References Cited

U.S. PATENT DOCUMENTS

| | | | | |
|---|---|---|---|---|
| 9,470,699 | B2* | 10/2016 | Peeters | ............... A61B 5/0002 |
| 9,528,861 | B1* | 12/2016 | Haupt | ................... G01D 7/00 |
| 2003/0117260 | A1* | 6/2003 | Fanshawe | .......... G07C 9/00023 340/5.7 |
| 2007/0052672 | A1 | 3/2007 | Ritter et al. | |
| 2008/0080396 | A1 | 4/2008 | Meijer et al. | |
| 2010/0290351 | A1 | 11/2010 | Toepke et al. | |
| 2012/0050018 | A1 | 3/2012 | Sajadi et al. | |
| 2012/0191566 | A1 | 7/2012 | Sayan | |
| 2012/0246077 | A1 | 9/2012 | Skaaksrud et al. | |
| 2013/0176115 | A1 | 7/2013 | Puleston et al. | |
| 2013/0204717 | A1 | 8/2013 | Bookstaff | |
| 2013/0210360 | A1* | 8/2013 | Ljung | .................... H04W 4/80 455/41.2 |
| 2013/0268773 | A1 | 10/2013 | Davis et al. | |
| 2013/0282438 | A1 | 10/2013 | Hunter et al. | |
| 2013/0318188 | A1* | 11/2013 | Liekens | ........... H04L 29/12594 709/206 |
| 2014/0115346 | A1 | 4/2014 | Ekberg et al. | |
| 2014/0149742 | A1 | 5/2014 | Yau | |
| 2014/0151446 | A1 | 6/2014 | Bovell | |
| 2014/0164254 | A1 | 6/2014 | Dimmick | |
| 2015/0070132 | A1* | 3/2015 | Candelore | .......... G07C 9/00182 340/5.61 |
| 2015/0228133 | A1* | 8/2015 | Capaldi-Tallon | .......................... G07C 9/00039 340/5.54 |
| 2015/0304804 | A1* | 10/2015 | Lotito | .................... G06F 3/017 455/41.1 |

FOREIGN PATENT DOCUMENTS

| | | |
|---|---|---|
| CN | 103400272 | 11/2013 |
| EP | 2665235 | 11/2003 |
| EP | 2779712 | 9/2004 |
| EP | 2071800 | 6/2009 |

* cited by examiner

SYSTEM AND METHOD FOR NETWORK NODE AUTHENTICATION

CROSS-REFERENCE TO RELATED APPLICATIONS

This application is a 371 U.S. National Phase of International PCT Patent Application No. PCT/US2015/061474, filed Nov. 19, 2015, which claims the benefit of and priority to U.S. Provisional Patent Application No. 62/082,794 filed Nov. 21, 2014, the content of which is expressly incorporated by reference herein in its entirety.

BACKGROUND OF THE INVENTION

1. Field of the Invention

The present disclosure relates to wireless devices, and more particularly to wireless devices such as sensors and sensor networks thereof.

2. Description of Related Art

Security systems generally involve a secured area protected by one or more sensors. The secured area may include some form of physical barrier (e.g., a wall, a fence, etc.) provided around the secured area with one or more portals (e.g., doors, windows, etc.) that allow entry into or egress from the secure area by authorized persons. The sensors need to be located throughout the secured area, e.g., to monitor the portals, and are generally coupled to a local alarm panel wirelessly. In most cases, the wireless exchange between transceivers is encrypted to avoid subversion of the security system. Usually, this requires the use of secret coding schemes.

Such conventional methods and systems have generally been considered satisfactory for their intended purpose. However, there is still a need in the art for improved wireless systems and methods. The present disclosure provides a solution for this need.

SUMMARY OF THE INVENTION

A method of commissioning a sensor includes using a system having a control panel, a sensor, and a cloud server. Identification codes from respective NFC tags that identify the control panel and sensor are read and transmitted to the cloud server. The control panel receives authorization information from the cloud server that identifies the sensor. The control panel receives information from the sensor when the information includes the authorization information that matches the authorization information received by the control panel.

The identification codes from the NFC tags and the authorization information can be stored in a database of the cloud server during manufacturing of the control panel and sensor. During manufacturing the NFC tags can be attached to the control panel and sensor, e.g., either disposed in the devices themselves or on the packaging. Reading the identification codes can be done using a mobile device equipped with an NFC reader. The cloud server can monitor the received identification code of the sensor and detect a non-authentic sensor when a duplicate identification code is received identifying a sensor already commissioned.

A system for commissioning a sensor includes a control panel having an NFC tag and a sensor having an NFC tag. A reader is programmed to read the identification codes of the respective NFC tags from the control panel and the sensor. A cloud server has a processor operatively connected to a memory wherein the memory includes instructions recorded thereon that, when read by the processor, cause the processor to receive the identification codes and transmit authorization information to the control panel.

The reader can be a mobile device equipped with an NFC reader and an associated mobile application. Upon activation, the application prompts a user to read the identification codes of the NFC tags of the control panel and sensor and transmit the identification codes to the cloud server.

The system can further include a database of unique sensor identification codes within the cloud server. The database can be populated during manufacturing of the sensors wherein the sensor identification codes are linked to the authorization information to identify each sensor.

A method of commissioning a sensor includes using a system having a reader, a control panel, a sensor, and a cloud server. Identification codes from respective NFC tags that identify the control panel and sensor are read and transmitted to the cloud server. A learn-in code is received from the cloud server by the reader and displayed to a user. The learn-in code is received at the control panel as input from the user.

A system for commissioning a sensor includes a control panel having an NFC tag and a sensor having an NFC tag. A reader is programmed to read the identification codes of the respective NFC tags from the control panel and the sensor. A cloud server has a processor operatively connected to a memory wherein the memory includes instructions recorded thereon that, when read by the processor, cause the processor to receive the identification codes and transmit a learn-in code to the reader.

The reader can include a display screen to display the learn-in code to a user. The control panel can include a user interface to accept the learn-in code as entered by the user.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
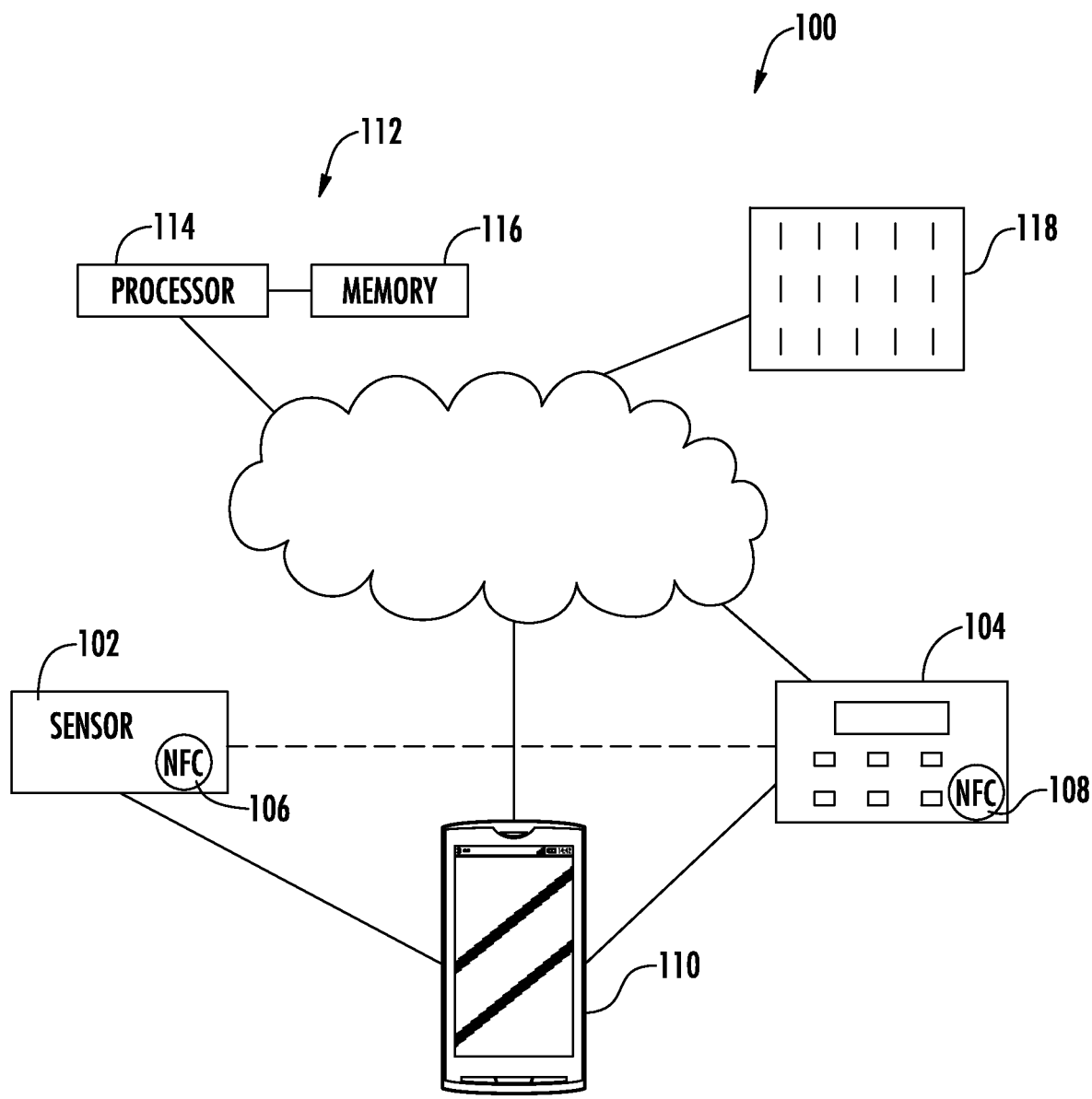
FIG. 1 is a schematic view of an exemplary embodiment of a system constructed in accordance with the present disclosure, showing a sensor and control panel each having an NFC tag where the control panel is in communication with a cloud server.

Reference will now be made to the drawings wherein like reference numerals identify similar structural features or aspects of the subject disclosure. For purposes of explanation and illustration, and not limitation, a partial view of an exemplary embodiment of a system and method for network node authentication in accordance with the disclosure is shown in FIG. 1 and is designated generally by reference character 100. Other embodiments of the system and method in accordance with the disclosure, or aspects thereof, are provided in FIGS. 2-4, as will be described.

Near field communication (NFC) technology has proven to be of particular value for setting up Wi-Fi networks and for pairing Bluetooth devices. These technologies can be of high value in the field of smart buildings. For example, they can be used to simplify the commissioning of wireless devices in a smart building. Commissioning can include operations that relate to the configuration of devices, such as establishing a network connection between devices, establishing a control relationship between devices and localizing devices in an environment. NFC technology provides particular advantages for commissioning sensors such as ease-of-installation. In addition, NFC technology can make commissioning procedures easy and intuitive to perform as it reduces the error-proneness of these procedures.

FIG. 1 illustrates a system 100 for commissioning of a sensor 102 with a control panel 104 using NFC technology. The sensor 102 and control panel 104 can, for example, be part of a security or authentication system of a secure building. Sensor 102 may be installed on a door such that when the door is opened without authorization, the sensor 102 will signal the control panel 104 to direct an alarm to sound. For ease of explanation sensor 102 and control panel 104 are described herein as relating to a security system, however other systems using sensors or other devices with a central control are contemplated without departing from the scope of the present disclosure. Shown in FIG. 1 is a single sensor 102 however it is to be understood that multiple sensors are envisioned for use with system 100.

Sensor 102 and control panel 104 are each manufactured with an NFC tag 106, 108, respectively, for wireless identification. The NFC tags 106, 108 can be manufactured within the devices (i.e. sensor and control panel), can be affixed to the devices, or can be part of the packaging of the devices. System 100 further includes a mobile device 110, such as a smart phone or tablet, that can access a cloud server 112. Cloud server 112 includes a processor 114 that is operatively connected to a memory 116. Cloud server 112 is also in communication with a database 118 of stored identification codes populated, e.g., during manufacturing of the sensor 102 and control panel 104, with the identification codes of the NFC tags 106, 108.

Figure 2:
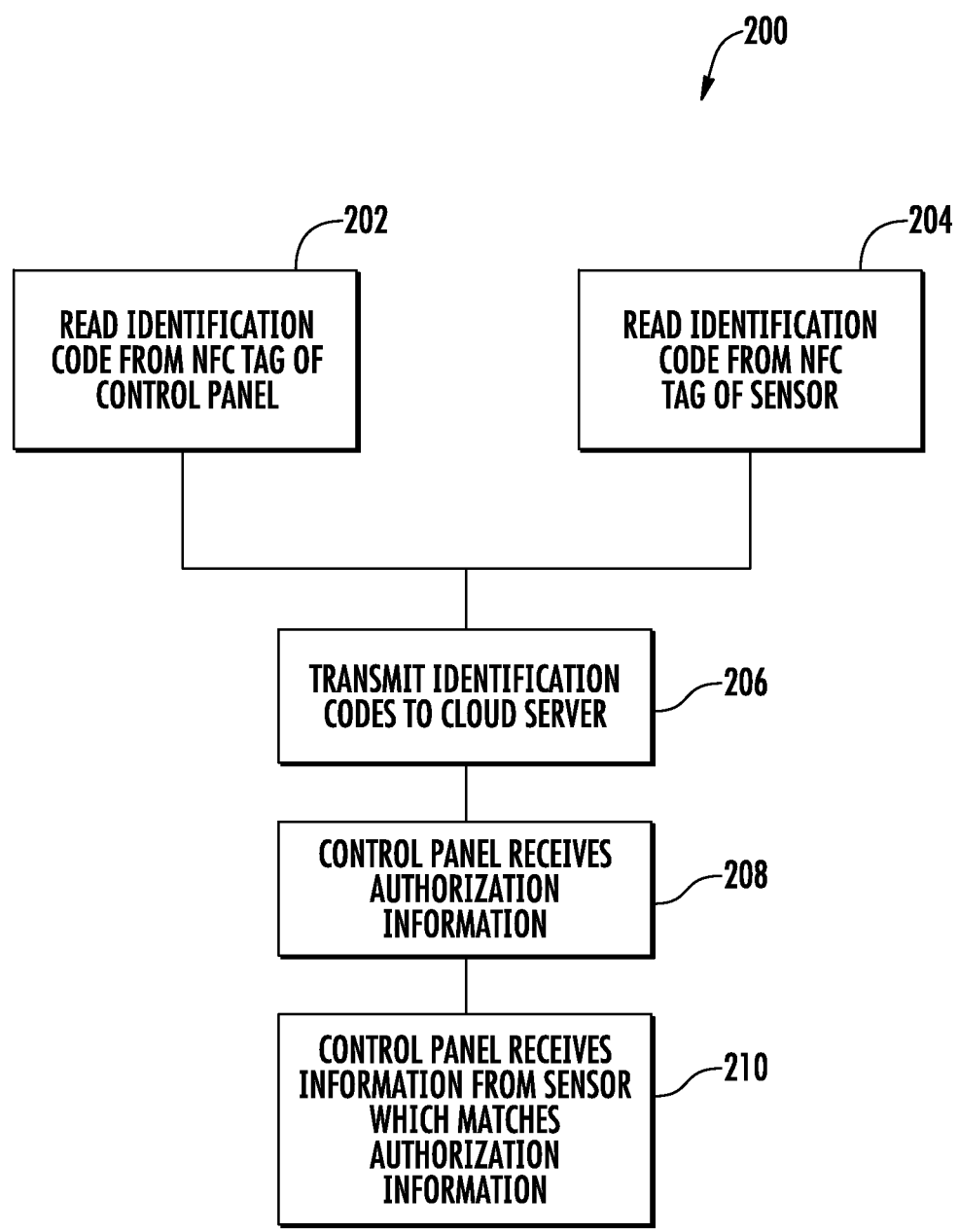
FIG. 2 is a flow diagram of an exemplary embodiment of a method using the system of FIG. 1.

FIG. 2 shows a method 200 for commissioning a sensor, e.g., sensor 102, using system 100. The described method 200 may be followed when control panel, e.g., control panel 104, has access to a cloud server, e.g. cloud server 112. Commissioning a sensor using system 300 (shown in FIG. 3) can also be accomplished when control panel does not have access to a cloud server as will be described in further detail below. To begin the method 200 of commissioning the sensor, a commissioning or learn-in application is activated on a mobile device, e.g., mobile device 110. The mobile device is equipped with an NFC reader such that the mobile device is placed near the sensor and control panel to read respective identification codes from NFC tags, as shown in boxes 202 and 204. The identification codes are transmitted by the mobile device and received at a processor, e.g., processor 114, of the cloud server as shown in box 206. More specifically, the processor receives the identification code from NFC tag, e.g., NFC tag 108, that identifies the control panel. The processor also receives the identification code from NFC tag, e.g. NFC tag 106, that identifies the sensor, as shown in box 204. The processor of the cloud server matches the identification code that identifies the sensor to one of a plurality of stored identification codes in a database e.g., database 118, connected to the cloud server. As shown in box 208, the processor transmits authorization information such as an encrypted unique sensor identification code (USIC) or a TX code to the control panel that is unique to the sensor. After receiving the authorization information, control panel is enabled to receive information from then sensor when the information includes authorization information that matches the authorization information received by the control panel, as shown in box 210. If the identification code that identifies the sensor is not found among the stored identification codes in the database, the processor will not transmit authorization information to the control panel. Further, if a duplicate identification code that identifies the sensor already commissioned is received by the processor, the processor will detect a non-authentic sensor and will not transmit authorization information to the control panel.

Figure 3:
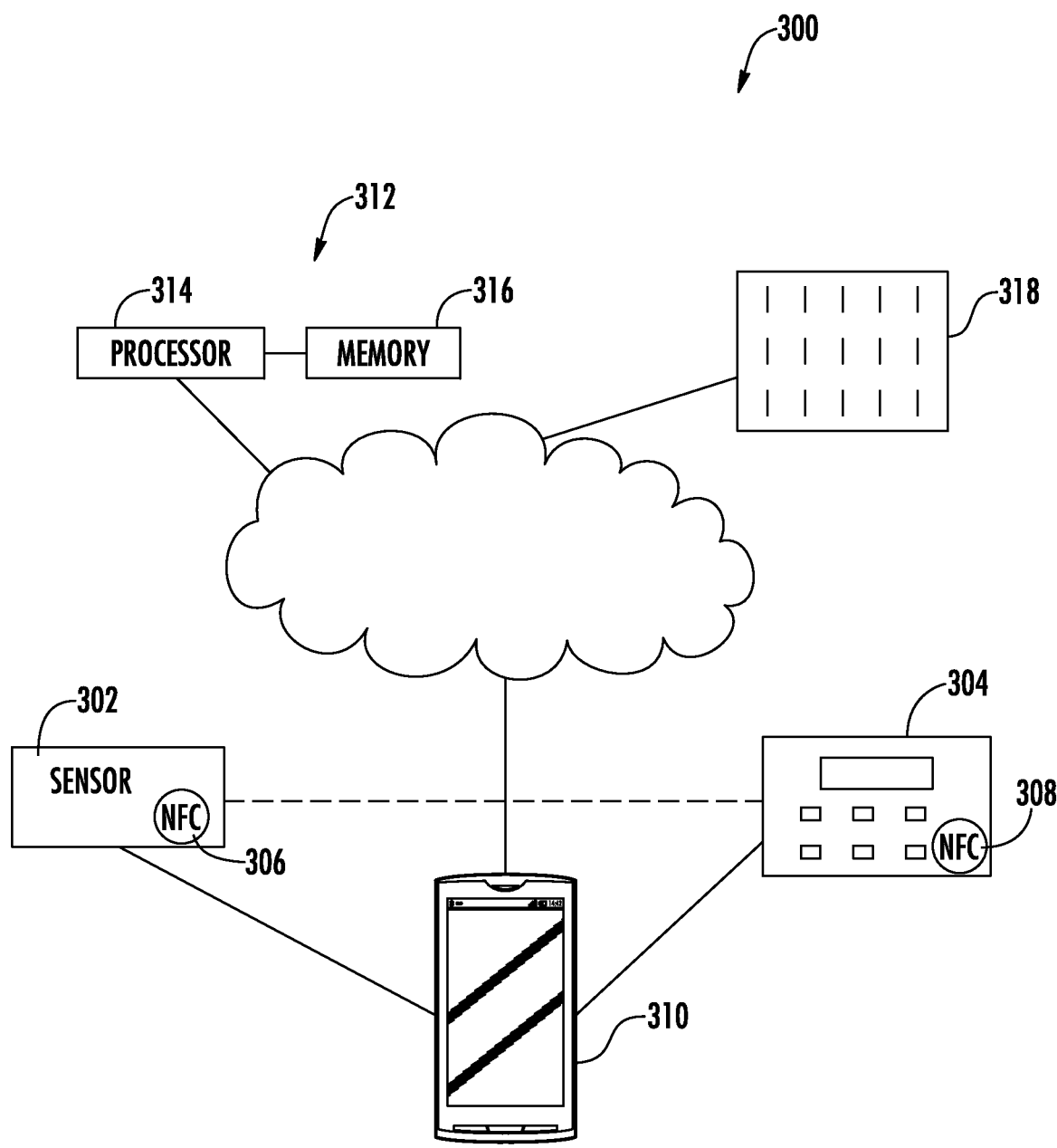
FIG. 3 is a schematic view of an another exemplary embodiment of a system in accordance with the present disclosure, showing a sensor and control panel having an NFC tag where the control panel is not in communication with a cloud server.
Figure 4:
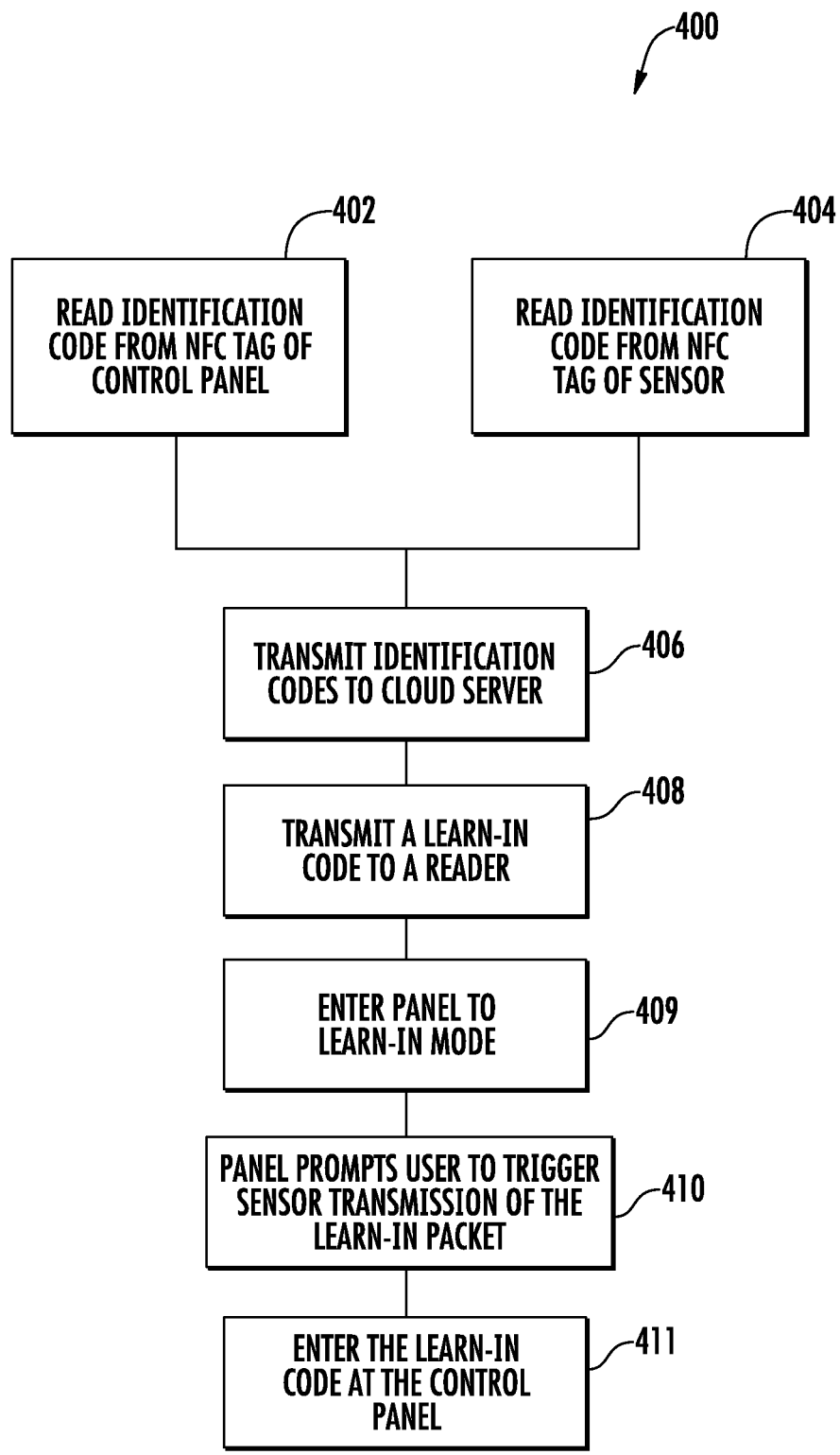
FIG. 4 is a flow diagram of an exemplary embodiment of a method using the system of FIG. 2.

With reference to FIGS. 3 and 4 another embodiment of the present disclosure is shown and described. System 300 is similar to system 100, however, control panel 304 does not have a connection with cloud server 312. During manufacturing of the control panel 304 a plurality of learn-in codes are stored in the control panel 304. Similar to system 100, cloud server 312 includes a processor 314 having a memory 316.

With reference to FIG. 4, a method 400 is shown for using system 300. As shown in boxes 402 and 404, cloud server, e.g., cloud server 312, receives an identification code from an NFC tag, e.g., NFC tag 306, of a sensor, e.g., sensor 302. The cloud server also receives an identification code from an NFC tag, e.g., NFC tag 308, of a control panel, e.g., control panel 304. The identification codes from the sensor and control panel are facilitated through a mobile device, e.g., mobile device 310, as shown in box 406. A processor, e.g., processor 314, of the cloud server matches the identification code that identifies the sensor to a plurality of stored identification codes in a database e.g., database 118, connected to the cloud server. As shown in box 408, the processor transmits a learn-in code to the mobile device to be manually entered into the control panel by a user. If a duplicate identification code is received identifying a sensor already commissioned, the processor will detect a non-authentic sensor and will not transmit a learn-in code to the mobile device.

After the learn-in code is received at the mobile device, the mobile device prompts the user to activate a learn-in mode of the control panel, as shown in box 409. The control panel prompts the user to trigger the sensor, as shown in box 410. Upon receiving a transmission from the sensor, as shown in box 411, the control panel prompts the user to enter the learn-in code displayed on the mobile device. The control panel matches the received learn-in code with the plurality of stored learn-in codes and if a match exists, the sensor is enabled to communicate with the control panel. If the learn-in code that identifies the sensor is not found among the stored learn-in codes in the control panel, the sensor will not be authenticated.

The methods and systems of the present disclosure, as described above and shown in the drawings, provide for systems and methods for network node authentication with superior properties including improved commissioning of sensors and other devices. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method of commissioning a sensor of a plurality of sensors with a control panel, comprising:
    reading, with a reader of a mobile device, a first identification code from a first near frequency communication (NFC) tag that identifies the control panel;
    reading, with the reader, a second identification code from a second NFC tag that identifies the sensor;
    transmitting the first and second identifications codes read from both the control panel and the sensor to a cloud server;
    receiving a learn-in code from the cloud server by the mobile device, and displaying the learn-in code to a user; and
    prompting the user to active a learn-in process by entering the displayed learn-in code into the control panel for activating a learn-in mode at the control panel,
    wherein the sensor is only enabled to communicate with the control panel if the control panel determines that the entered learn-in code matches a stored learn-in code.

2. The method of claim 1, wherein the first and second identification codes, from the first and second NFC tags, and authorization information are stored in a database of the cloud server during manufacturing of the control panel and the sensor.

3. The method of claim 1, further comprising manufacturing the control panel and sensor with NFC tags attached thereto.

4. The method of claim 1, wherein the reader is an NFC reader.

5. The method of claim 1, wherein the cloud server monitors the received second identification code of the sensor and determines that the sensor is a non-authentic sensor when the second identification code is a duplicate of an identification code previously received identifying a different commissioned sensor.

6. A system for commissioning a sensor of a plurality of sensors with a control panel, comprising:
    a mobile device having a reader and a mobile application programmed to:
        read a first identification code from a first near frequency communication (NFC) tag that identifies the control panel;
        read a second identification code from a second NFC tag that identifies the sensor;
        transmit the first and second identification codes read from the control panel and the sensor to a cloud server;
        receive a learn-in code from the cloud server to the reader of the mobile device;
        display the learn-in code to a user; and
        prompt the user to activate a learn-in process by entering the displayed learn-in code into the control panel for activating a learn-in mode at the control panel,
        wherein the sensor is only enable to communicate with the control panel if the control panel determines that the entered learn-in code matches a stored learn-in code.

7. The system of claim 6, wherein the mobile application is further programmed to, upon activation, prompt the user to read the first and second identification codes of the first and second NFC tags of the respective control panel and sensor.

8. The system of claim 7, wherein the mobile device includes a display screen to display the learn-in code to the user.

9. The system of claim 8, wherein the control panel includes a user interface to accept the learn-in code entered by the user.

10. The system of claim 6, further comprising a database of unique sensor identification codes, wherein the database is within the cloud server and populated during manufacturing of the plurality of sensors, wherein the unique sensor identification codes are linked to authorization information to identify each of the plurality of sensors.

* * * * *